(12) United States Patent
Fales et al.

(10) Patent No.: US 11,354,470 B1
(45) Date of Patent: Jun. 7, 2022

(54) SYSTEM AND METHOD FOR DEVICE PLACEMENT

(71) Applicant: Cadence Design Systems, Inc., San Jose, CA (US)

(72) Inventors: Jonathan Robert Fales, Finksburg, MD (US); Joshua David Tygert, Seneca, PA (US); Rwik Sengupta, Austin, TX (US); Timothy H. Pylant, La Grange, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/173,440

(22) Filed: Feb. 11, 2021

(51) Int. Cl.
*G06F 30/31* (2020.01)

(52) U.S. Cl.
CPC .................................. *G06F 30/31* (2020.01)

(58) Field of Classification Search
CPC ....................................................... G06F 30/31
USPC ............................................................ 716/139
See application file for complete search history.

(56) References Cited

U.S. PATENT DOCUMENTS

| 2007/0147269 | A1* | 6/2007 | Ettle | H04W 16/18 370/254 |
| 2016/0110490 | A1* | 4/2016 | Ding | G06F 30/394 716/126 |

* cited by examiner

*Primary Examiner* — Eric D Lee
(74) *Attorney, Agent, or Firm* — Mark H. Whittenberger, Esq.; Holland & Knight LLP

(57) ABSTRACT

Embodiments include herein are directed towards a method for use in an electronic design environment is provided. Embodiments may include receiving, using a processor, an initial data set associated with an electronic design and performing a built in self-discovery (BISD) analysis based upon, at least in part, the initial data set. Embodiments may include displaying, at a graphical user interface, a plurality of tiered, user-selectable options and receiving a user input corresponding to a selection of at least one of the plurality of tiered, user selectable options. Embodiments may also include tuning the plurality of tiered user selectable options based upon, at least in part, the user input.

20 Claims, 15 Drawing Sheets

SYSTEM AND METHOD FOR DEVICE PLACEMENT

FIELD OF THE INVENTION

The present disclosure relates to electronic design automation (EDA), and more specifically, to a method for device placement in an electronic design.

DISCUSSION OF THE RELATED ART

EDA utilizes software tools that may be used in the design and analysis of numerous electronic systems such as printed circuit boards (PCBs) and integrated circuits (ICs). Some of these tools allow for device placement using various approaches. In existing systems, schematic designers may pass on a schematic to a layout designer. Layout designers may then spend days to determine an optimal placement by trial and error. That is followed by many iterations with schematic designers to match margins taken for parasitics. This type of manual placement is by far the largest use model today, however, its trial and error nature is time consuming and does not leverage information within the data to help the user.

SUMMARY

In one or more embodiments of the present disclosure, a computer-implemented method for use in an electronic design environment is provided. The method may include receiving, using a processor, an initial data set associated with an electronic design and performing a built in self-discovery (BISD) analysis based upon, at least in part, the initial data set. The method may include displaying, at a graphical user interface, a plurality of tiered, user-selectable options and receiving a user input corresponding to a selection of at least one of the plurality of tiered, user selectable options. The method may also include tuning the plurality of tiered user selectable options based upon, at least in part, the user input.

One or more of the following features may be included. The method may include displaying, at the graphical user interface, an updated plurality of tiered user selectable options, based upon, at least in part, the tuning. The plurality of tiered user selectable options may each be displayed using a different color. The initial data set may include ordered, parametric information. The plurality of tiered user selectable options may be based upon, at least in part, a total weighted score for one or more instances of the electronic design. The method may further include providing a user-selectable automatic option that automatically selects a highest rated option of the plurality of tiered user selectable options. The total weighted score may be personalized on a per-user basis.

In one or more embodiments of the present disclosure a computer-readable storage medium having stored thereon instructions, which when executed by a processor result in one or more operations is provided. Operations may include receiving, using a processor, an initial data set associated with an electronic design and performing a built in self-discovery (BISD) analysis based upon, at least in part, the initial data set. Operations may include displaying, at a graphical user interface, a plurality of tiered, user-selectable options and receiving a user input corresponding to a selection of at least one of the plurality of tiered, user selectable options. Operations may also include tuning the plurality of tiered user selectable options based upon, at least in part, the user input.

One or more of the following features may be included. Operations may include displaying, at the graphical user interface, an updated plurality of tiered user selectable options, based upon, at least in part, the tuning. The plurality of tiered user selectable options may each be displayed using a different color. The initial data set may include ordered, parametric information. The plurality of tiered user selectable options may be based upon, at least in part, a total weighted score for one or more instances of the electronic design. Operations may further include providing a user-selectable automatic option that automatically selects a highest rated option of the plurality of tiered user selectable options. The total weighted score may be personalized on a per-user basis.

In one or more embodiments of the present disclosure, a system for use in an electronic design environment is provided. The system may include at least one processor configured to receive an initial data set associated with an electronic design and to perform a built in self-discovery (BISD) analysis based upon, at least in part, the initial data set. The at least one processor may be further configured to display, at a graphical user interface, a plurality of tiered, user-selectable options. The at least one processor may be further configured to receive a user input corresponding to a selection of at least one of the plurality of tiered, user selectable options and to tune the plurality of tiered user selectable options based upon, at least in part, the user input.

One or more of the following features may be included. The at least one processor may be further configured to display, at the graphical user interface, an updated plurality of tiered user selectable options, based upon, at least in part, the tuning. In some embodiments, the plurality of tiered user selectable options may each be displayed using a different color. In some embodiments, the initial data set may include ordered, parametric information. The plurality of tiered user selectable options may be based upon, at least in part, a total weighted score for one or more instances of the electronic design. The at least one processor may be further configured to provide a user-selectable automatic option that automatically selects a highest rated option of the plurality of tiered user selectable options.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Embodiments of the present disclosure include systems and methods to enable schematic designers to determine an optimal relative placement of devices in a future layout, based on a machine-learning enabled parametric analysis. In some embodiments, an interactive-to-automatic, adaptive placement system with tuning and library implementation is provided.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
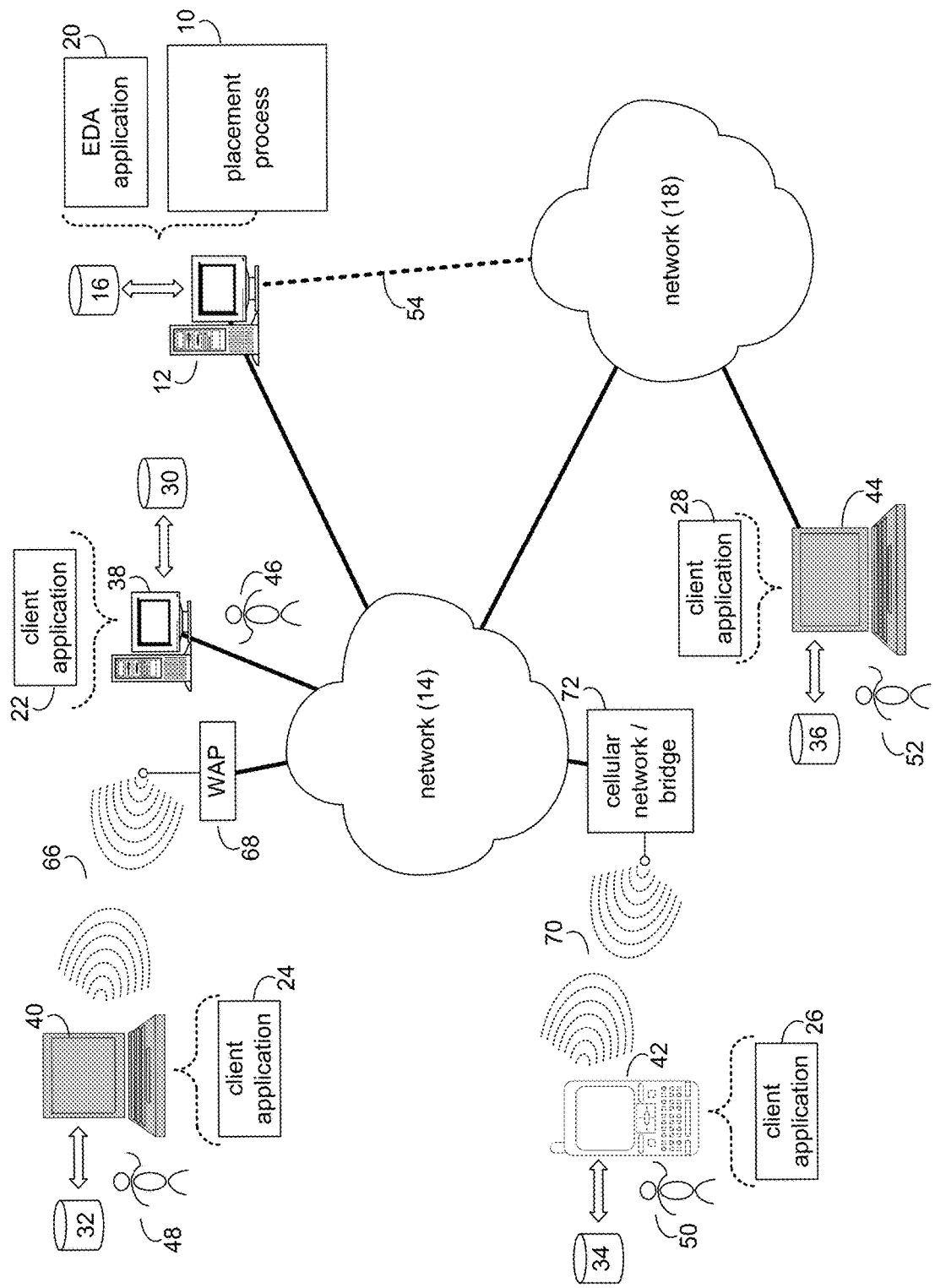
FIG. 1 is a system diagram depicting aspects of the placement process in accordance with an embodiment of the present disclosure.

Referring to FIG. 1, there is shown placement process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the placement process may reside on and be executed, in whole or in part, by a client electronic device, such as a personal computer, notebook computer, personal digital assistant, or the like.

The instruction sets and subroutines of placement process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Placement process 10 may be a stand alone application, or may be an applet/application/script that may interact with and/or be executed within EDA application 20. In addition/ as an alternative to being a server-side process, the manufacturing design rule analysis process may be a client-side process (not shown) that may reside on a client electronic device (described below) and may interact with an EDA client application (e.g., one or more of EDA client applications 22, 24, 26, 28). Further, the placement process may be a hybrid server-side/client-side process that may interact with EDA application 20 and an EDA client application (e.g., one or more of client applications 22, 24, 26, 28). As such, the placement process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize placement process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14. In some embodiments, placement process 10 may be a cloud-based process as any or all of the operations described herein may occur, in whole, or in part, in the cloud or as part of a cloud-based system.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to iOS®, ANDROID™, Microsoft Windows, Microsoft Windows CE®, Red Hat Linux, or other suitable operating system. (Windows CE is a registered trademark of Microsoft Corporation in the United States, other countries, or both.).

Referring now to FIGS. 2-19 embodiments of a placement process 10 are provided. As will be discussed in further detail below, embodiments of placement process 10 may include receiving 202, using a processor, an initial data set associated with an electronic design and performing 204 a built in self-discovery (BISD) analysis based upon, at least in part, the initial data set. The process may include displaying 206, at a graphical user interface, a plurality of tiered, user-selectable options and receiving 208 a user input corresponding to a selection of at least one of the plurality of tiered, user selectable options. The method may also include tuning 210 the plurality of tiered user selectable options based upon, at least in part, the user input. Each of these operations and others will be discussed in further detail hereinbelow.

Figure 3:
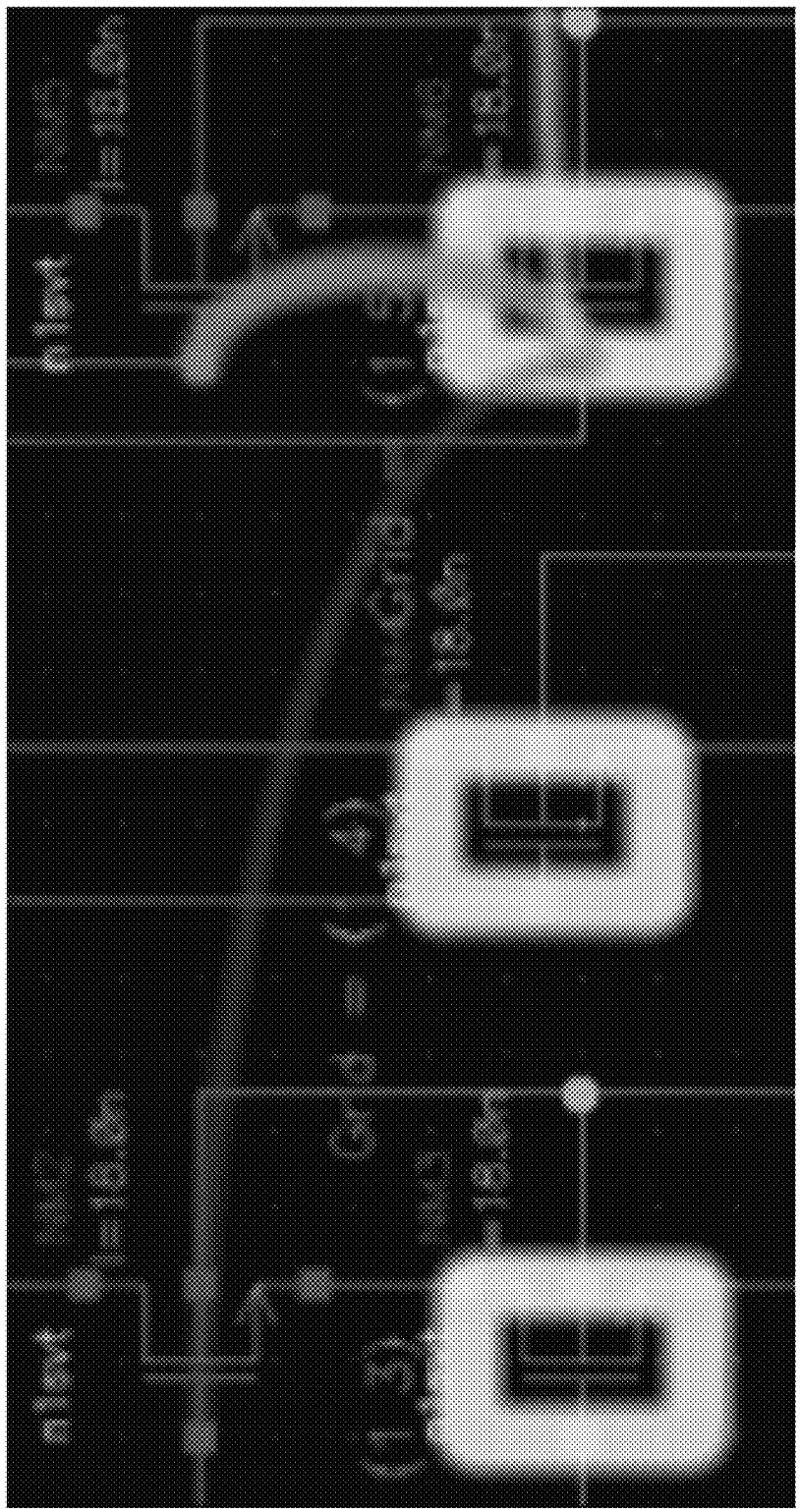
FIG. 3 shows a graphical user interface depicting aspects of the placement process in accordance with an embodiment of the present disclosure.
Figure 4:
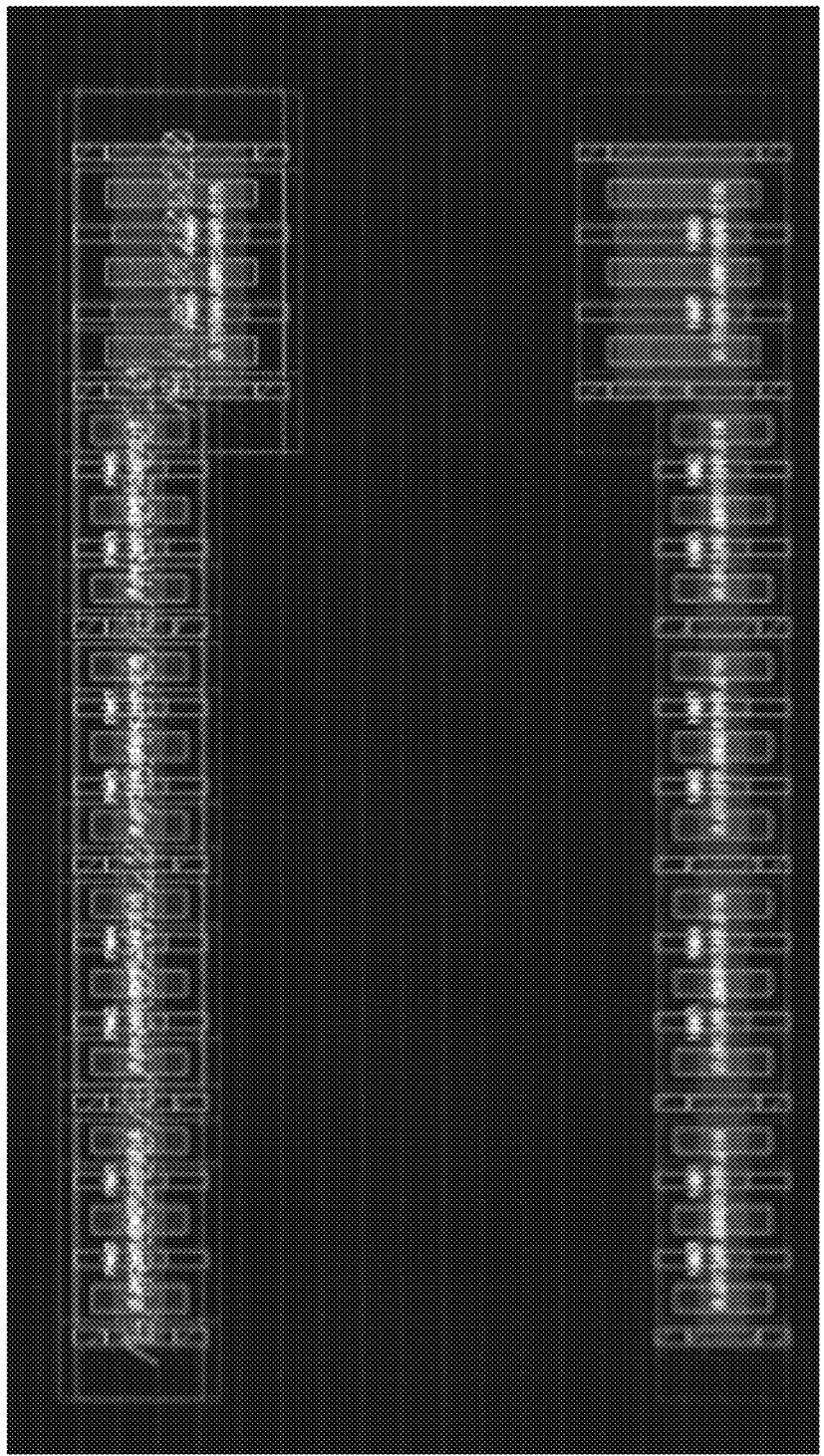
FIG. 4 shows a graphical user interface depicting aspects of the placement process in accordance with an embodiment of the present disclosure.

Referring now to FIGS. 3-4, embodiments of the present disclosure showing an example initial schematic and resultant layout are provided in FIG. 3 and FIG. 4, respectively. Embodiments included herein are directed towards a system and method that leverages certain intrinsic and essential device information and determines the ideal relative placement while learning from the user's input and adapting and interactively guiding the next placement action. The system may provide configurable feedback for optimal placement, by the multiplicity of concurrent, incremental, and evolving learning criteria.

Figure 5:
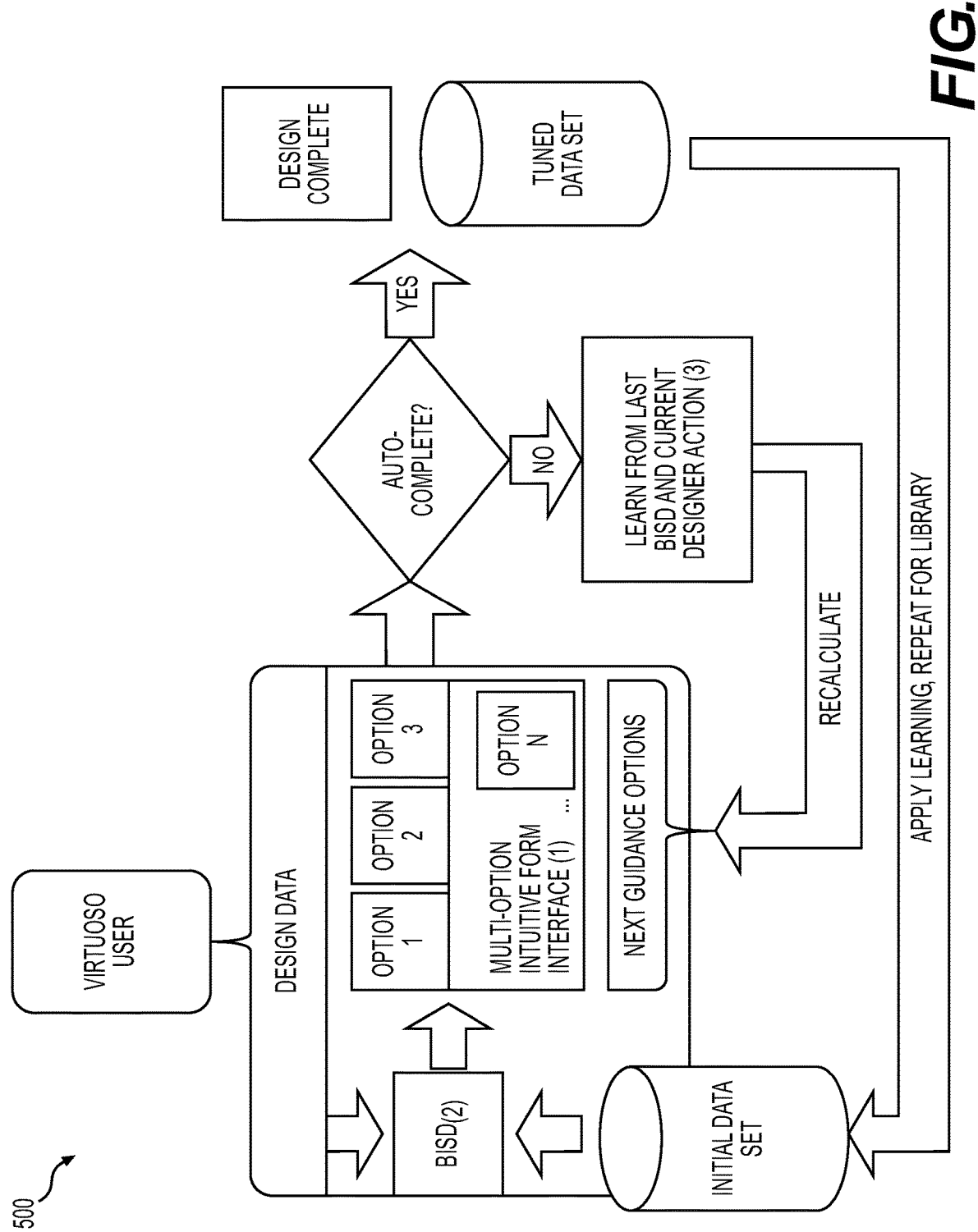
FIG. 5 is a diagram depicting aspects of the placement process in accordance with an embodiment of the present disclosure.

Referring now to FIG. 5, an embodiment showing an example diagram 500 consistent with embodiments of placement process 10 is provided. In operation, embodiments of placement process 10 may access and/or receive a schematic and then provide designers a plurality of possible choices (e.g., best, better, good; or other scheme) at a graphical user interface to select the next instance relative placement, based on the parametric data of the current instance and neighborhood instances. In some embodiments, the sequence of choices continues offering, for example, 3 (or N) choices for the remainder of the instances in the schematic. Additionally and/or alternatively the designer may choose to have the "best" choice used for the remainder of instances, in which case instances may be placed automatically based on "best" choice guidance.

In some embodiments, placement process 10 may allow for a special weighting of choices that may be given to key parametric data (e.g., instance source/drain sharing, common gate connection, similar geometrical properties, and similar) when providing guidance. Embodiments of placement process 10 may include machine learning capability that may be applied so that the system remembers choices made by a particular designer so that future choices are driven by past choices. Additionally and/or alternatively, embodiments of placement process 10 may allow for other connectivity scenarios, parametric information, instance properties or combinations of the prior data can be flexibly added to the algorithm for constraints imposed by future technologies.

In some embodiments, placement process 10 may be capable of selecting the best choice for each placement sequence and may place all instances in the schematic automatically, or at any point in the selection process. This may be customizable on a per user basis.

In some embodiments, once all the placement sequences are assigned either interactively or automatically, placement process 10 may interface with existing API(s) to place the schematic instances in the layout, while respecting the exact constraints presently included in the schematic. The placement positions may be saved in the schematic view for reuse in other technology nodes. The parametric training of weighted choices may also be saved for future initial condition use of the next schematic.

Figure 6:
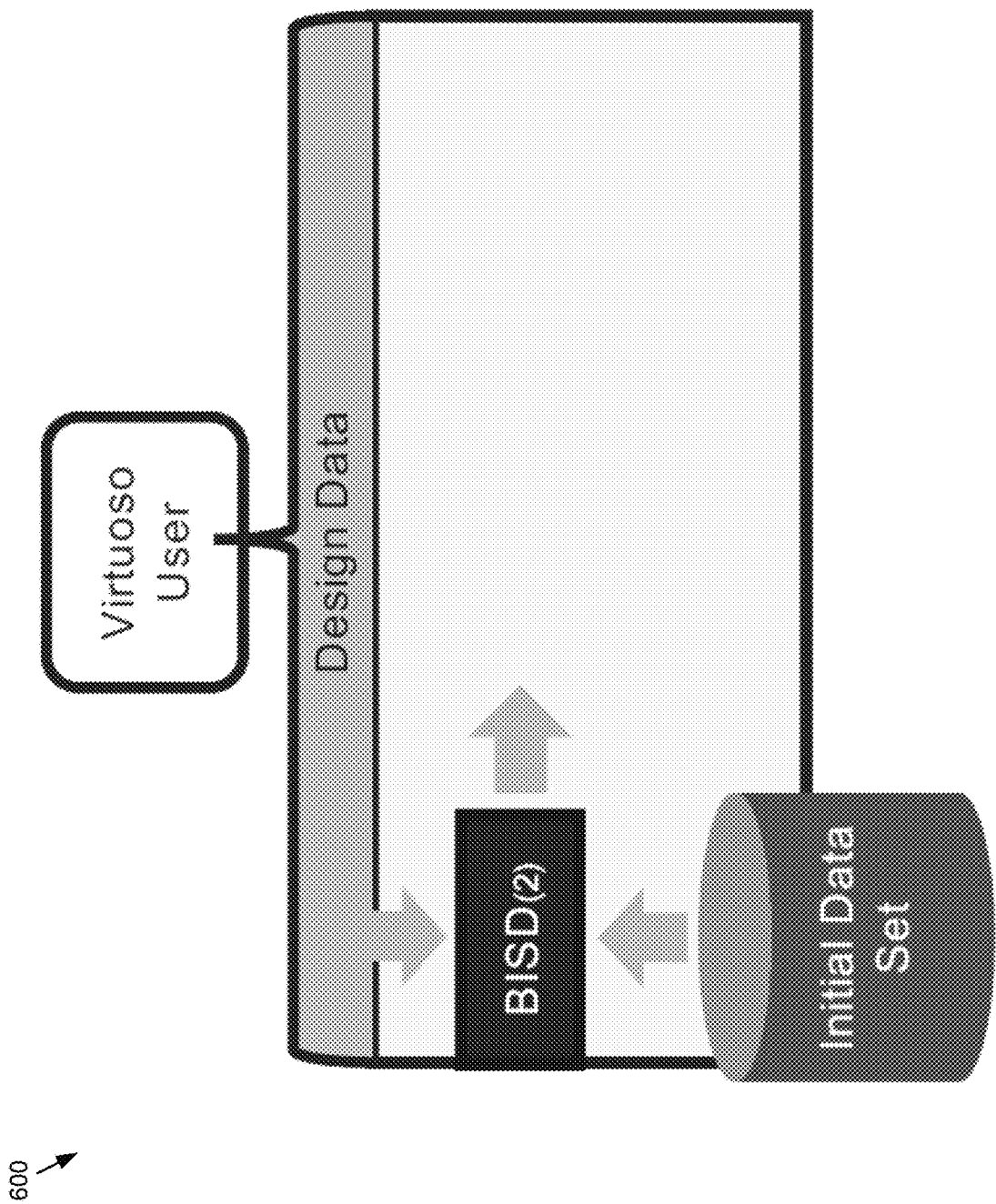
FIG. 6 is a diagram depicting aspects of the placement process in accordance with an embodiment of the present disclosure.
Figure 7:
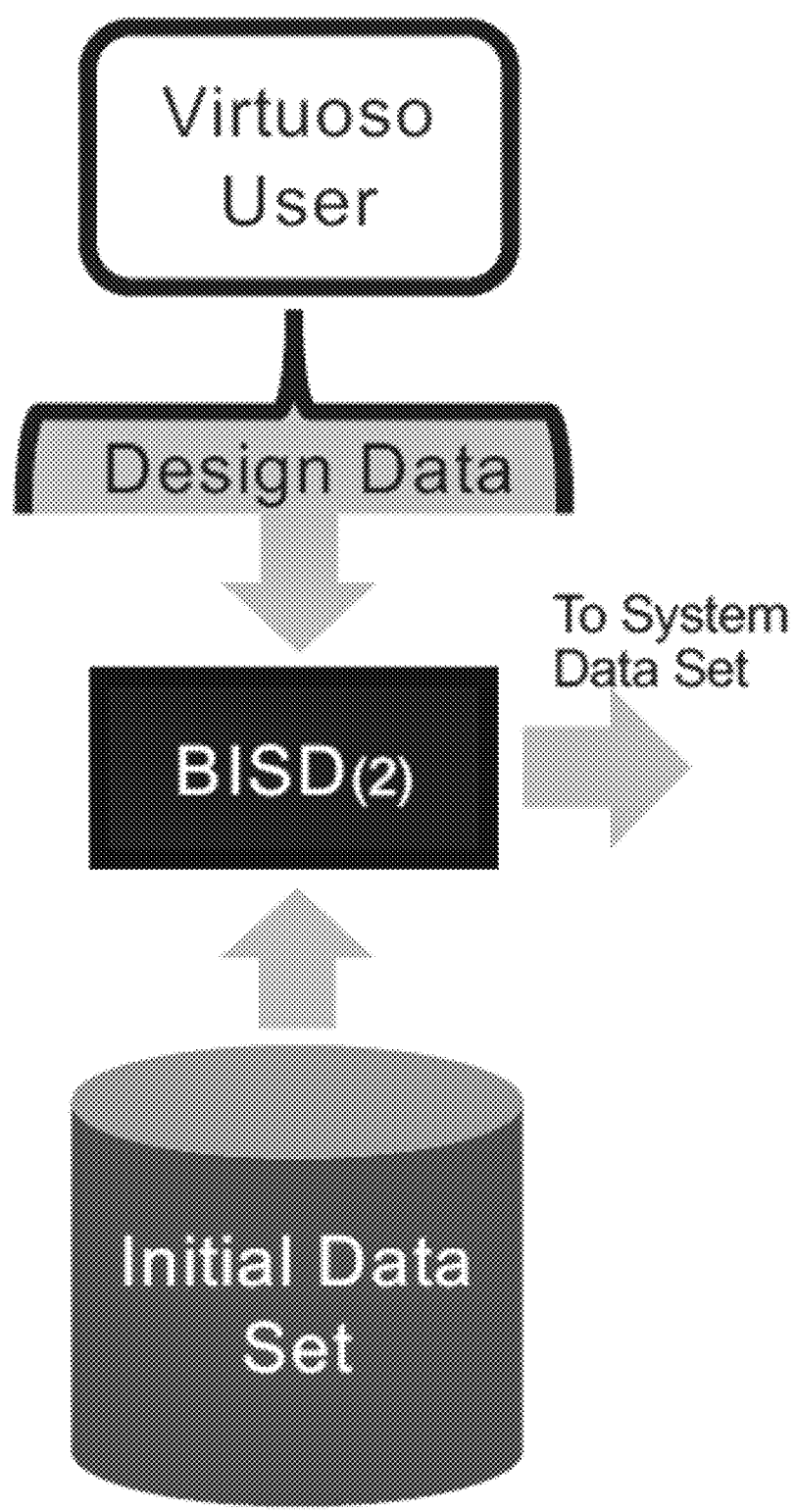
FIG. 7 is a diagram depicting aspects of the placement process in accordance with an embodiment of the present disclosure.

Referring now to FIGS. 6-7, embodiments of placement process 10 may utilize a built-in self-discovery (BISD) analysis and scoring on start-up, based on an expandable template and data set, and populated by intrinsic device and network information. This intrinsic information may include, but is not limited to, instance parameter and network information.

In operations, when arranging devices in layout, designers have many things to consider while creating an efficient design. Some factors, like number of fins or device type are obvious to the designer. Other factors, like device connections and placement parameters may be more difficult or impossible to recognize.

In some embodiments, placement process 10 may utilize a test set that contains tests for obvious and subtle placement considerations. Example tests may include, but are not limited to, gate connection and poly width in devices aligned vertically, poly width and number of fins in devices arranged horizontally, shared source or drain nets in neighbor devices, etc. This "initial data set" information may then be organized in a structure or template, in order to allow the BISD to be flexible and expandable, independent of the number or type of tests. This system initializes the interactive sequence of test and scoring for each instance.

Referring now to FIG. 6, a diagram 600 consistent with embodiments of placement process 10 is provided. In some embodiments, the BISD described herein may be configured to leverage a template for the query, score and merge of intrinsic parameter information (expandable). The BISD may also gather only the necessary information. Accordingly, this allows placement process 10 to accomplish its purpose without external information and may also provide the information to the tests. The BISD may then score each instance for all tests and merge the scoring results with the initial data set (if available).

Referring now to FIG. 7, a diagram 700 consistent with embodiments of placement process 10 is provided. In some embodiments, there may be numerous processes that may be used to gather the correct information from the design data. This may be achieved using one or more templates (e.g. using intrinsic, essential information, etc.). Some template examples may include, but are not limited to, gate connected instances, source/drain connected instances, channel length, fin pitch, implant layer, width or number of fins, etc. Other template information may include one or more counter examples some of which may include, but are not limited to, number of dummies, device name, all connectivity, etc. The template may be used to guide the built-in query. In some embodiments, this may be expandable (e.g., add/remove parameters or network information) and may also allow for the addition of one or more scoring functions. The BISD may be used to merge the design data information with the initial data set to complete system initialization. It should be noted that without the BISD process, the initialization of the system would be flawed, it would take too long for the system to learn. As such, its presence provides a significant improvement over existing techniques.

In some embodiments, every time the user is about to select the next device in the placement, placement process 10 may test all of the possible devices with each test in the test set, and provide a score for that test. Each test may be assigned an initial weight at the start of the process (e.g., this may be part of the initial data set and may be seeded from a prior run). The weight may be a numeric way of stating the importance of each test and it may change over time based on the user's selection. Each test may be multiplied times its respective weight to give each available instance a total score.

$$\text{Total Score} = \sum_{k=0}^{n} Test_k * Weight_k$$

Figure 8:
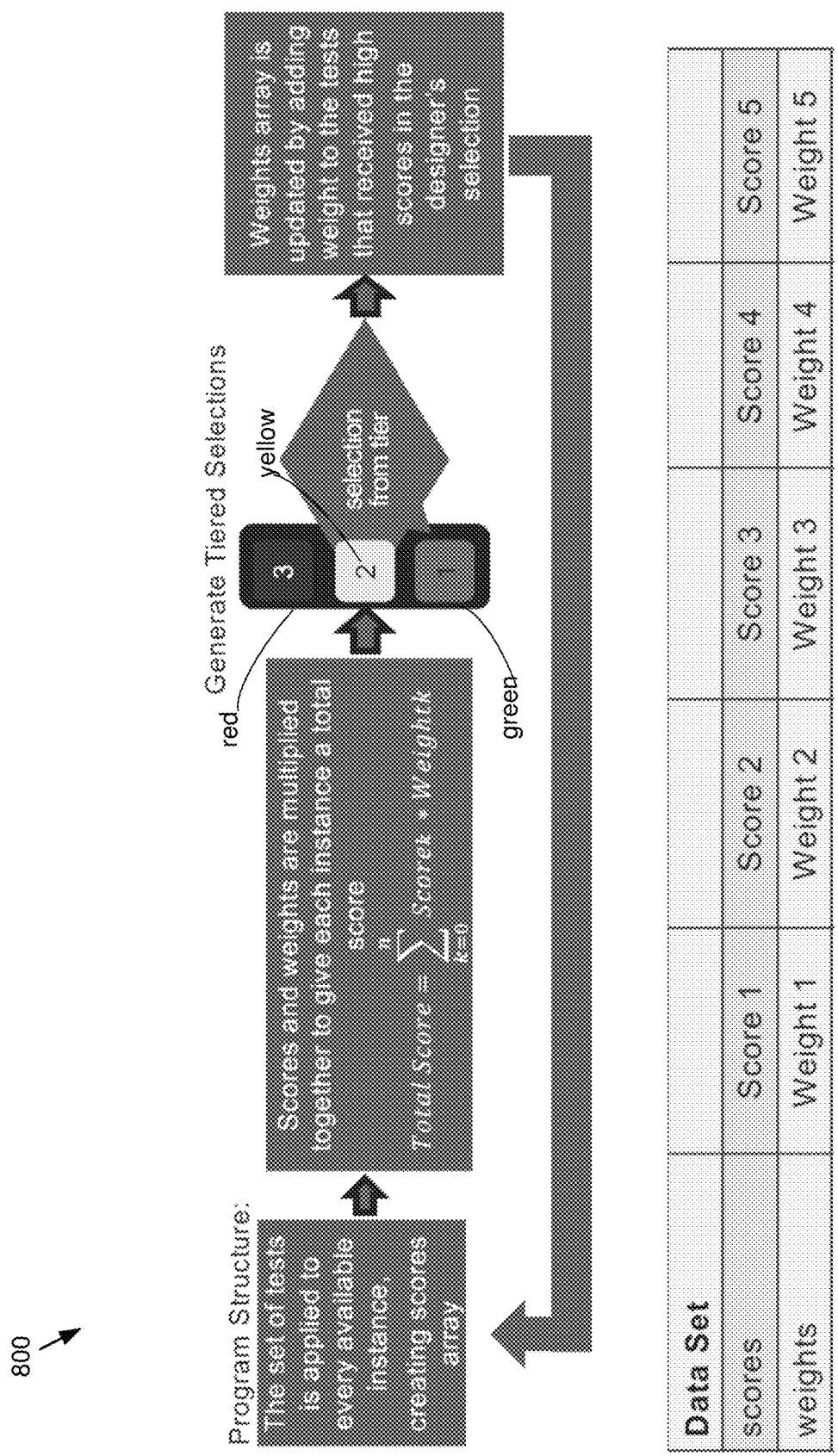
FIG. 8 is a diagram depicting aspects of the placement process in accordance with an embodiment of the present disclosure.
Figure 9:
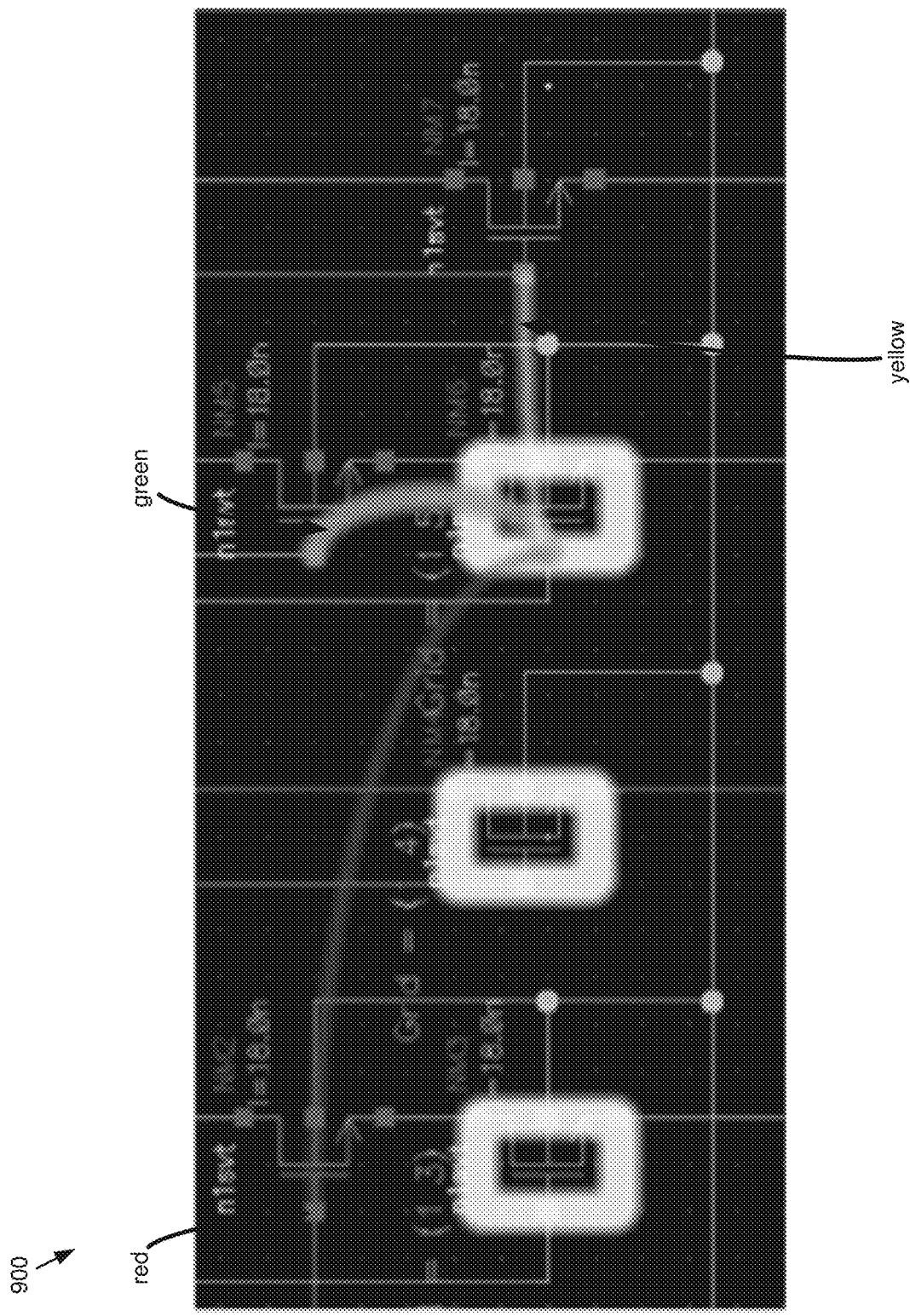
FIG. 9 shows a graphical user interface depicting aspects of the placement process in accordance with an embodiment of the present disclosure.

Referring now to FIGS. 8-9 a diagram 800 and schematic 900 consistent with embodiments of placement process 10 are provided. In some embodiments placement process 10 may be configured to allow for tiered tuning, which provides a multiple selection mechanism of intuitively ordered, cognitively familiar options, to provide efficient tuning. Placement process 10 is configured to provide feedback to the user and the system. For example, the system may allow for the handling of a dynamic data set for iterative and interactive circuit tuning or generation of entire libraries based on learning. In this example, the tiered selections may be displayed using green, yellow, and red graphical indicators as shown in FIGS. 8-9. The highest score is the best option and is highlighted with a green line. The next best scores are yellow and then red. "NM5" is the first suggestion. The main reason for this is that it shares a source/drain net with the current suggestion: "NM6". In this example, the devices with halos have already been processed.

Figure 10:
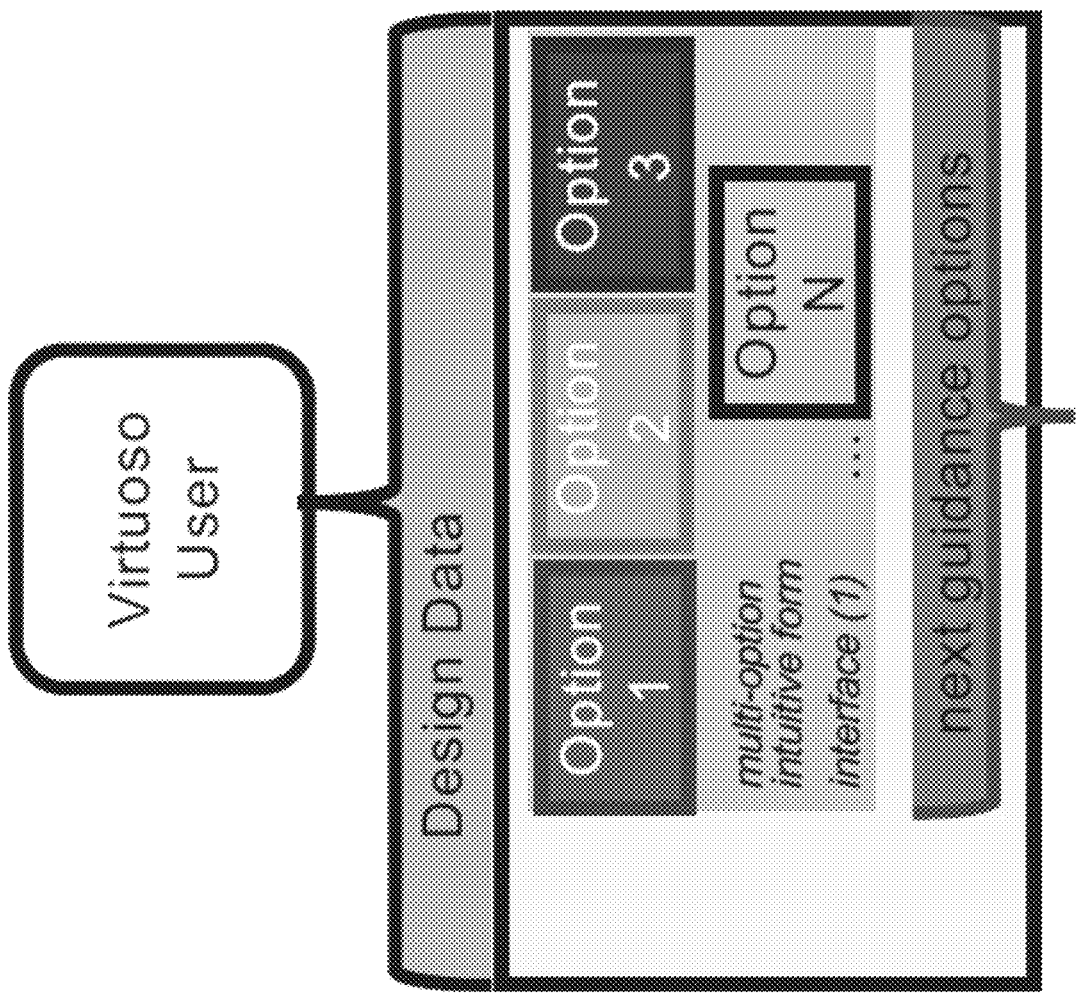
FIG. 10 is a diagram depicting aspects of the placement process in accordance with an embodiment of the present disclosure.

Referring now to FIG. 10, a diagram 1000 showing another example of tiered tuning is provided. In operation, placement process 10 may receive the data set from BISD and present multiple tiers based on the learning at that point. Placement process 10 may then accept the user's selection and then re-calculate, or tune, the weights (changing the guidance), as part of the system's feedback capability. The tiered tuning capability allows the system to adjust in a reasonable amount of time, which is an advantage over existing approaches.

Figure 11:
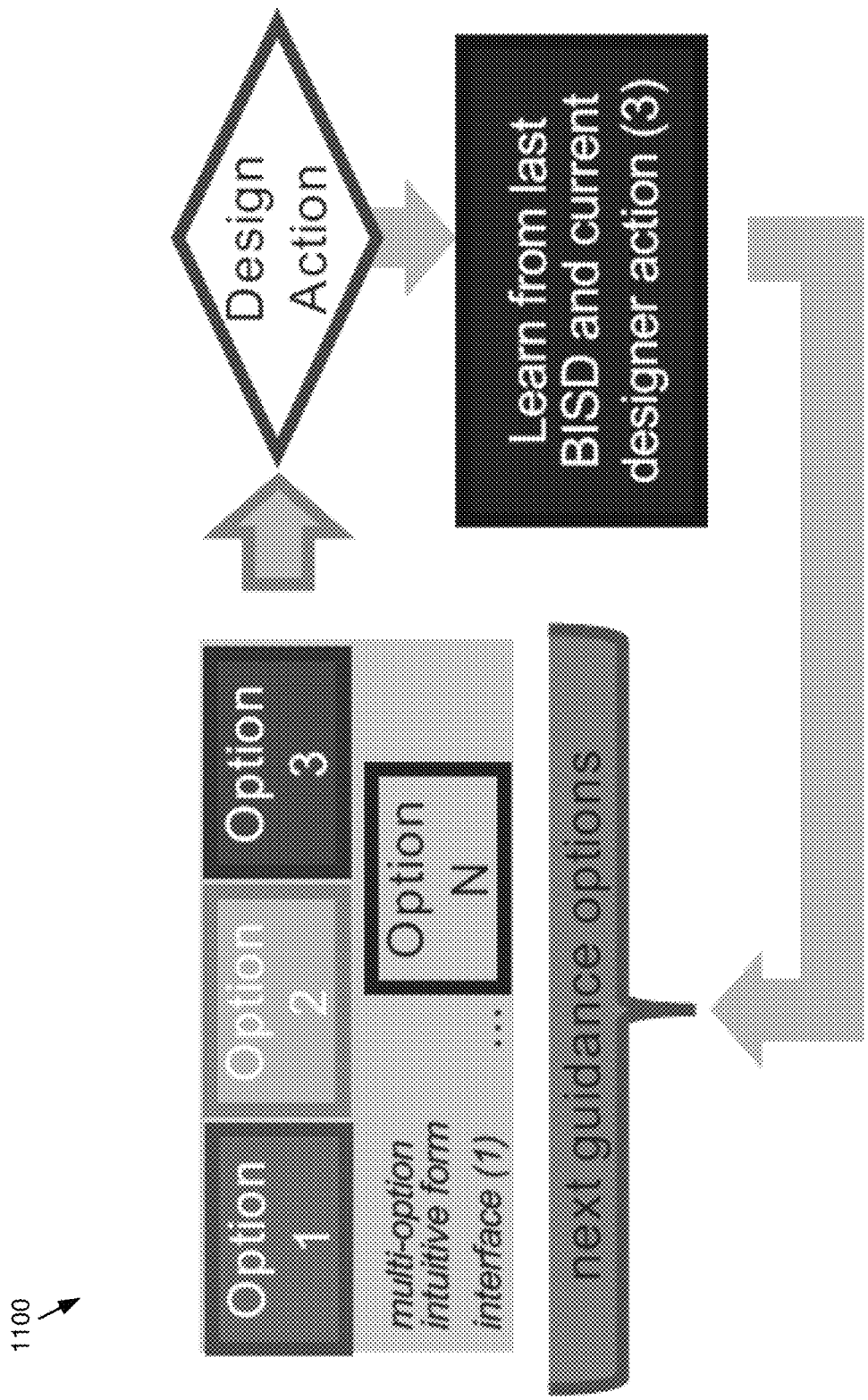
FIG. 11 is a diagram depicting aspects of the placement process in accordance with an embodiment of the present disclosure.

Referring also to FIG. 11, a diagram 1100 showing another example of tiered tuning is provided. In this example, placement process 10 may make three suggestions and observes as the designer picks the device that prioritizes the tests that are important to them. Placement process 10 may add weight to the tests that the designer prioritizes. In this way, each choice the designer makes may indicate what is and is not important to them. The situations where the designer does not select the green suggestion are very important learning opportunities. In a more general embodiment, more options may be presented and faster tuning may be possible, especially with a scaling function applied to the successive iterations.

Figure 12:
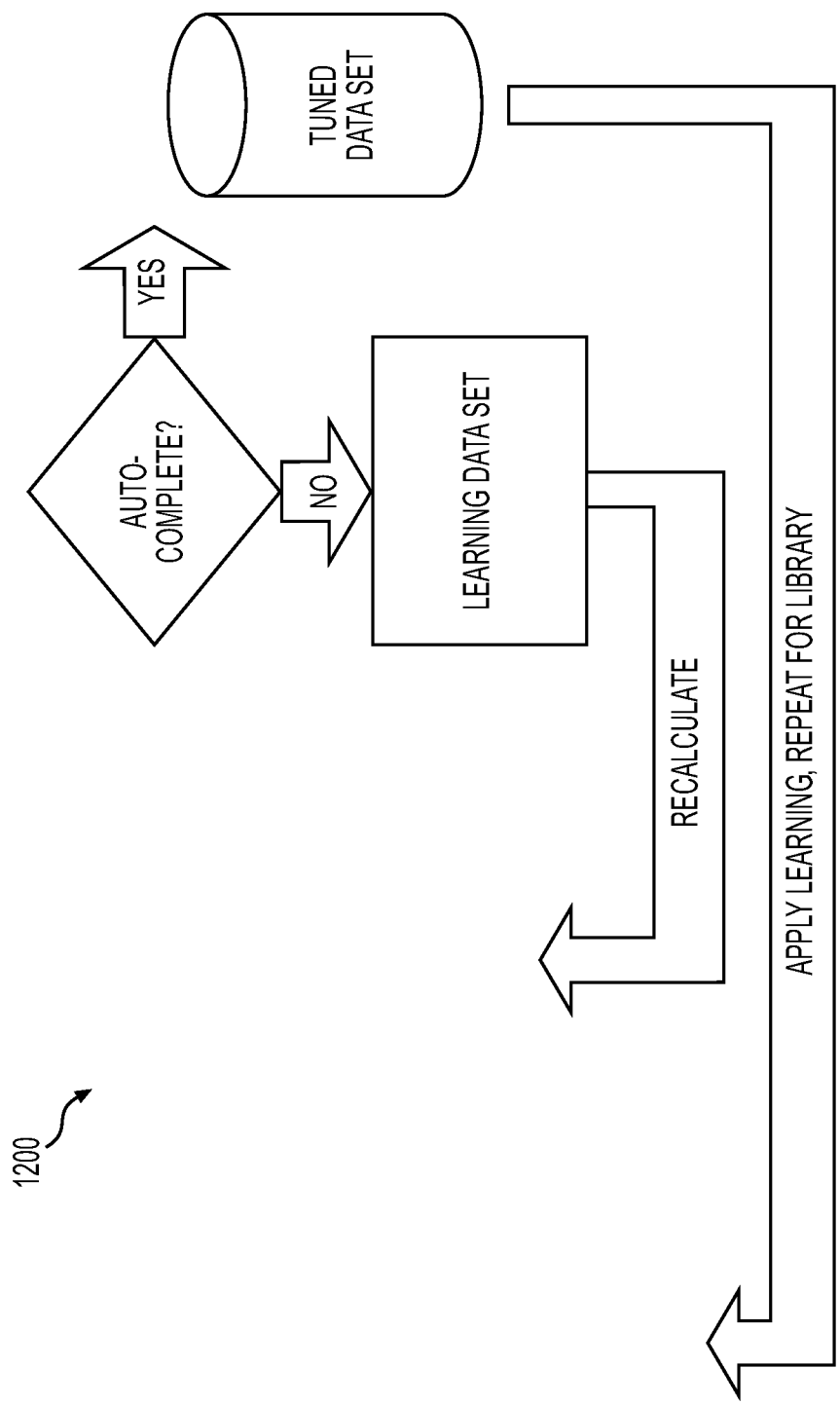
FIG. 12 is a diagram depicting aspects of the placement process in accordance with an embodiment of the present disclosure.

Referring now to FIG. 12, a diagram 1200 showing configurable feedback components consistent with embodiments of placement process 10 is provided. The feedback components are configurable using numerous approaches. For example, a scaling function could be added to the learned data set to improve its behavior. Additionally and/or alternatively, the tuned data set could add one or more "untuned" parameters for the next run, and provide learning on a new, merged parameter set, but with a set of weights that were previously tuned for the previous parameter set.

Figure 13:
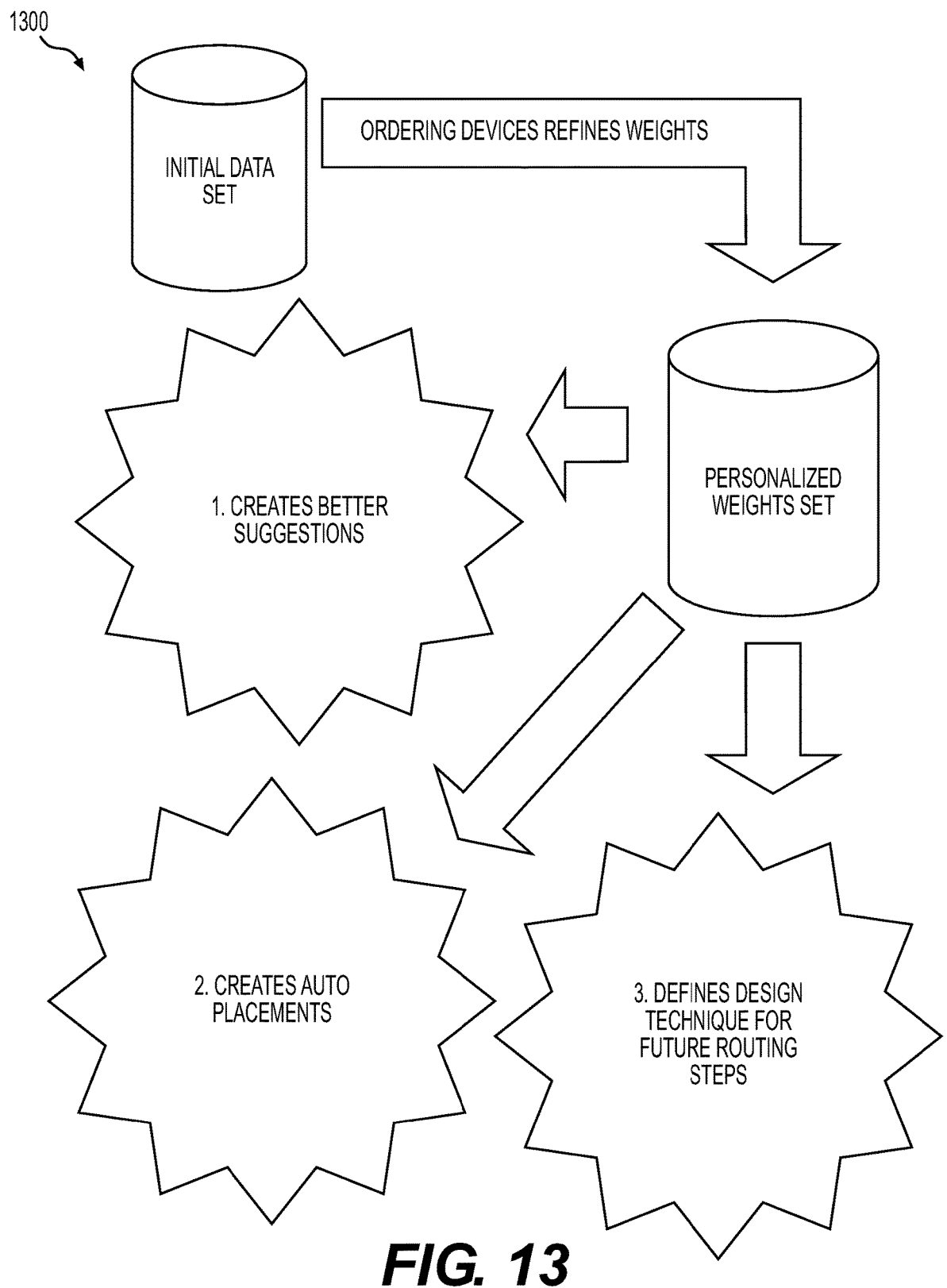
FIG. 13 is a diagram depicting aspects of the placement process in accordance with an embodiment of the present disclosure.

In some embodiments, and referring now to FIG. 13, placement process 10 may leverage the features of multiplicity and order to the design guidance, and combine that with the BISD result based on the initial data set. Accordingly, machine learning has been primed for efficiency and effectiveness. The suggestions may quickly customize to the individual designer's design preferences. With the weights established, the process may be able to automatically generate complete placements. Therefore an option may be provided to configure the system into a training mode or a generate mode. In some embodiments, the designer may approve the placement or opt to see other options, each one customized to their individual design preferences. This allows the user to generate entire libraries automatically, based on a small tuned data set.

Figure 14:
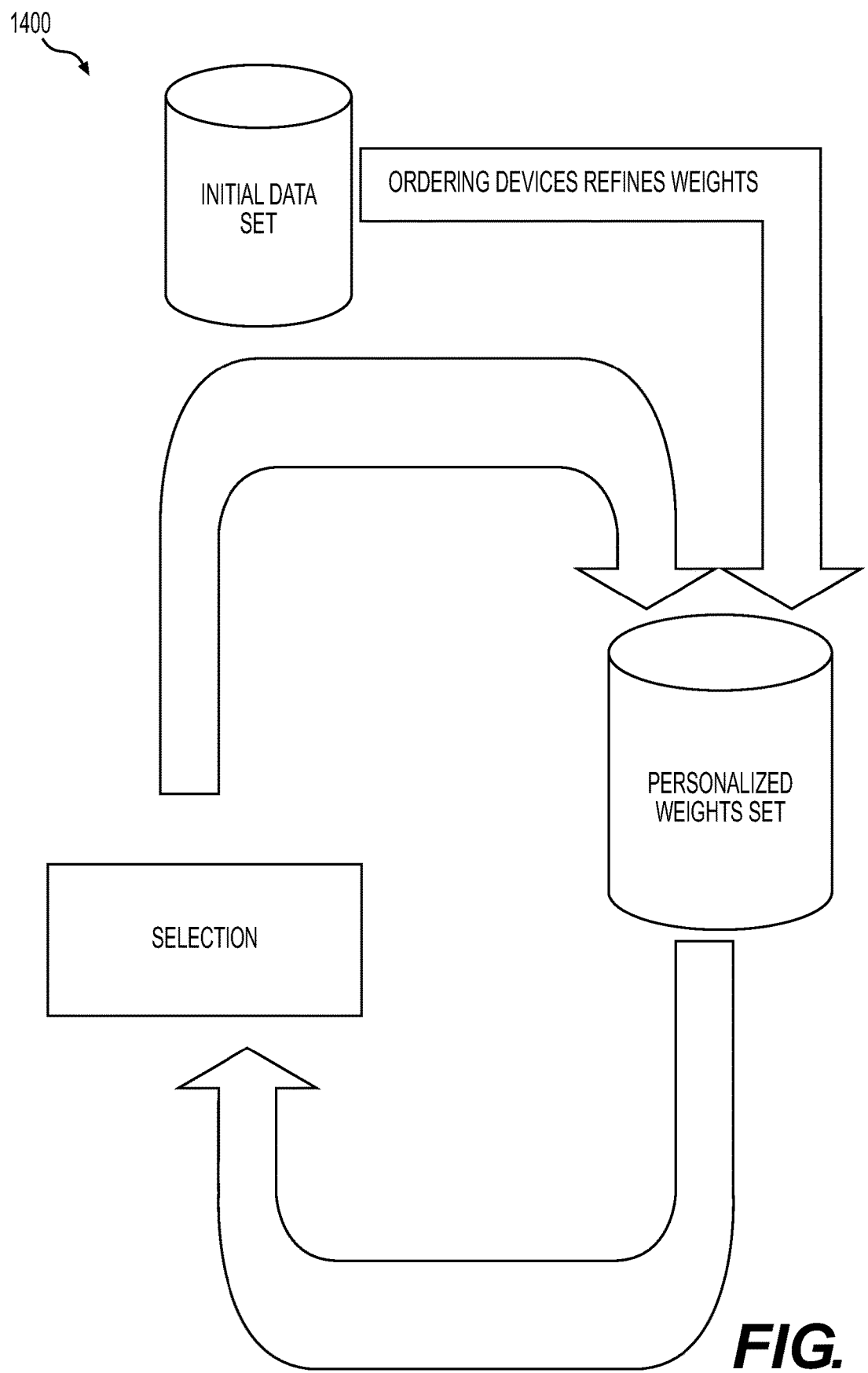
FIG. 14 is a diagram depicting aspects of the placement process in accordance with an embodiment of the present disclosure.

Referring now to FIG. 14, a diagram 1400 showing an example feedback implementation consistent with embodiments of placement process 10 is provided. The personalized weight set may be updated on each iteration. It may also be saved at the end of a placement to be used in other placements and future steps in that placement (e.g., this is where the current analysis result may become the "initial data set" of another run).

Figure 2:
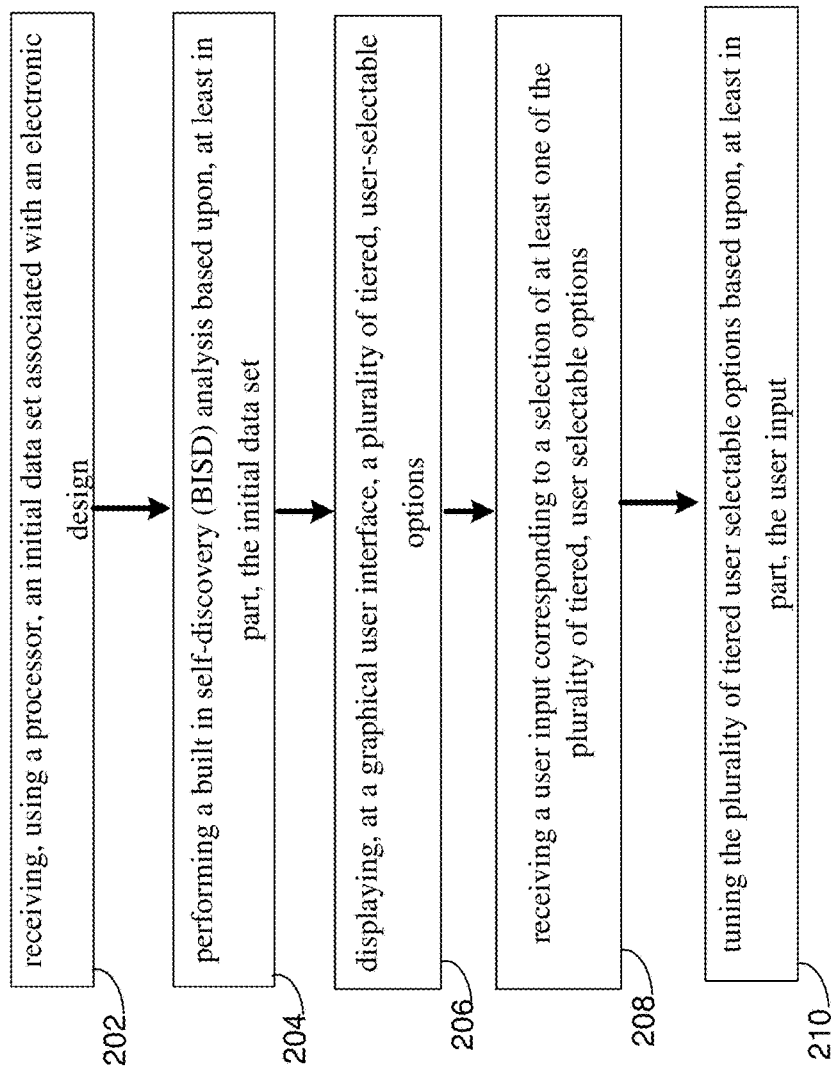
FIG. 2 is a flowchart depicting operations consistent with the placement process of the present disclosure.
Figure 15:
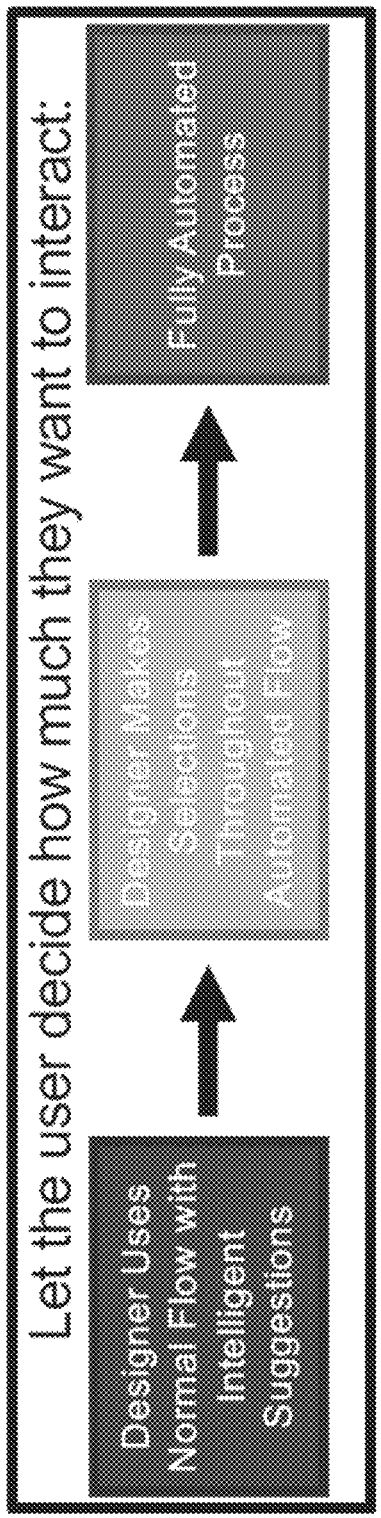
FIG. 15 is a diagram depicting aspects of the placement process in accordance with an embodiment of the present disclosure.

Embodiments of placement process 10 rely upon cognitive psychology concepts. The intuitive nature of the tiered guidance is possible due to the impact of cognitive psychology on the graphical interface design. Familiarity is the keyword and it is of utmost importance here. Accordingly, a traffic light's "Red, Yellow, and Green" may be used to indicate order without cluttering environment and confusing the user. As shown in FIGS. 2-3, the schematic may be transformed to an efficient placement by designer selection or automation. As shown in FIG. 15, placement process 10 may allow the user to maintain the same design flow even though the system is either making suggestions, decisions or a mix of each.

Accordingly, and as discussed herein, embodiments of placement process 10 may manage the complexity of the instance placement parameters and their relationships interactively and adaptively, based on the user's actions. Placement process 10 may provide adaptive placement guidance to designers, interfaced with existing placement routines reducing trial and error, and enabling a layout designer to achieve a better result, with reduced parasitic overhead, reducing design margins and therefore power consumption by circuit. Placement process provides improved layout productivity by enabling sequential, batch, or hybrid placement selection guidance in the schematic that is interfaced with connectivity driven auto-placement engines that respect the schematic placement constraints.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an electronic design environment comprising:
   receiving, using a processor, an initial data set associated with an electronic design;
   performing a built in self-discovery (BISD) analysis based upon, at least in part, the initial data set;
   displaying, at a graphical user interface, a plurality of tiered, user-selectable options;
   receiving a user input corresponding to a selection of at least one of the plurality of tiered, user selectable options; and
   tuning the plurality of tiered user selectable options based upon, at least in part, the selection of at least one of the plurality of tiered, user selectable options.

2. The computer-implemented method of claim 1, further comprising:
   displaying, at the graphical user interface, an updated plurality of tiered user selectable options, based upon, at least in part, the tuning.

3. The computer-implemented method of claim 1, wherein the plurality of tiered user selectable options are each displayed using a different color.

4. The computer-implemented method of claim 1, wherein the initial data set includes ordered, parametric information.

5. The computer-implemented method of claim 1, wherein the plurality of tiered user selectable options are based upon, at least in part, a total weighted score for one or more instances of the electronic design.

6. The computer-implemented method claim 5, wherein the total weighted score is personalized on a per-user basis.

7. The computer-implemented method of claim 1, further comprising:
   providing a user-selectable automatic option that automatically selects a highest rated option of the plurality of tiered user selectable options.

8. A non-transitory computer-readable storage medium having stored thereon instructions that when executed by a machine result in the following operations:
   receiving, using a processor, an initial data set associated with an electronic design;
   performing a built in self-discovery (BISD) analysis based upon, at least in part, the initial data set;
   displaying, at a graphical user interface, a plurality of tiered, user-selectable options;
   receiving a user input corresponding to a selection of at least one of the plurality of tiered, user selectable options; and
   tuning the plurality of tiered user selectable options based upon, at least in part, the selection of at least one of the plurality of tiered, user selectable options.

9. The non-transitory computer-readable storage medium of claim 8, further comprising:
   displaying, at the graphical user interface, an updated plurality of tiered user selectable options, based upon, at least in part, the tuning.

10. The non-transitory computer-readable storage medium of claim 8, wherein the plurality of tiered user selectable options are each displayed using a different color.

11. The non-transitory computer-readable storage medium of claim 8, wherein the initial data set includes ordered, parametric information.

12. The non-transitory computer-readable storage medium of claim 8, wherein the plurality of tiered user selectable options are based upon, at least in part, a total weighted score for one or more instances of the electronic design.

13. The non-transitory computer-readable storage medium of claim 12, wherein the total weighted score is personalized on a per-user basis.

14. The non-transitory computer-readable storage medium of claim 8, further comprising:
   providing a user-selectable automatic option that automatically selects a highest rated option of the plurality of tiered user selectable options.

15. A system for use in an electronic design environment comprising:
- a computing device having at least one processor configured to receive an initial data set associated with an electronic design and to perform a built in self-discovery (BISD) analysis based upon, at least in part, the initial data set, the at least one processor further configured to display, at a graphical user interface, a plurality of tiered, user-selectable options, the at least one processor further configured to receive a user input corresponding to a selection of at least one of the plurality of tiered, user selectable options and to tune the plurality of tiered user selectable options based upon, at least in part, the selection of at least one of the plurality of tiered, user selectable options.

16. The system of claim 15, wherein the at least one processor is further configured to display, at the graphical user interface, an updated plurality of tiered user selectable options, based upon, at least in part, the tuning.

17. The system of claim 15, wherein the plurality of tiered user selectable options are each displayed using a different color.

18. The system of claim 15, wherein the initial data set includes ordered, parametric information.

19. The system of claim 15, wherein the plurality of tiered user selectable options are based upon, at least in part, a total weighted score for one or more instances of the electronic design.

20. The system of claim 15, wherein the at least one processor is further configured to provide a user-selectable automatic option that automatically selects a highest rated option of the plurality of tiered user selectable options.

* * * * *